United States Patent
Rubens et al.

(10) Patent No.: US 10,020,834 B2
(45) Date of Patent: Jul. 10, 2018

(54) RADIO OVER INTERNET PROTOCOL DEVICES AND METHODS FOR INTEROPERABILITY WITH LAND MOBILE RADIO DEVICES

(71) Applicant: Persistent Systems, LLC, New York, NY (US)

(72) Inventors: Herbert B. Rubens, New York, NY (US); Artur Zak, Staten Island, NY (US)

(73) Assignee: Persistent Systems, LLC, New York, NY (US)

( * ) Notice: Subject to any disclaimer, the term of this patent is extended or adjusted under 35 U.S.C. 154(b) by 0 days.

(21) Appl. No.: 15/701,595

(22) Filed: Sep. 12, 2017

(65) Prior Publication Data

US 2018/0076842 A1    Mar. 15, 2018

Related U.S. Application Data

(60) Provisional application No. 62/394,621, filed on Sep. 14, 2016.

(51) Int. Cl.

| | |
|---|---|
| *H04M 1/253* | (2006.01) |
| *H04B 1/3827* | (2015.01) |
| *H04M 1/02* | (2006.01) |
| *H04B 1/3888* | (2015.01) |
| *H04W 4/10* | (2009.01) |
| *H04M 1/725* | (2006.01) |
| *H04M 1/04* | (2006.01) |

(52) U.S. Cl.
CPC ......... *H04B 1/3833* (2013.01); *H04B 1/3888* (2013.01); *H04M 1/0254* (2013.01); *H04M 1/04* (2013.01); *H04M 1/2535* (2013.01); *H04M 1/72575* (2013.01); *H04W 4/10* (2013.01)

(58) Field of Classification Search
None
See application file for complete search history.

(56) References Cited

U.S. PATENT DOCUMENTS

| | | | | |
|---|---|---|---|---|
| 5,212,714 | A | * | 5/1993 | Grindahl ............ H04L 1/08 375/216 |
| 6,449,491 | B1 | * | 9/2002 | Dailey ............ H04W 4/10 455/518 |
| 2008/0031207 | A1 | * | 2/2008 | Martinez ............ H04W 4/10 370/338 |

(Continued)

*Primary Examiner* — David Bilodeau
(74) *Attorney, Agent, or Firm* — Steven I. Wallach

(57) ABSTRACT

Devices and methods are provided that permit interoperability between Radio over Internet Protocol (RoIP) devices and land mobile radio (LMR) devices. In one device according to the invention, a networked radio includes a wireless network transceiver, an LMR signal connector, and an analog-to-digital converter/digital-to-analog converter (ADC/DAC). A computer processor that inputs data from or outputs data to the ADC/DAC includes a sound architecture and a server. The server includes a digital audio buffer, a voice-activity detector, and a daemon. The daemon is configured to (1) collect data on one or more variables affecting a best-choice determination for transmitting a communications signal intended for retransmission to one or more LMR devices, and (2) make the best-choice determination based on the data collected.

17 Claims, 13 Drawing Sheets

(56) References Cited

U.S. PATENT DOCUMENTS

2011/0111791 A1* 5/2011 Martz ................... H04W 88/04
                                                    455/552.1
2015/0296351 A1* 10/2015 Tham ...................... H04W 4/10
                                                    455/518

* cited by examiner

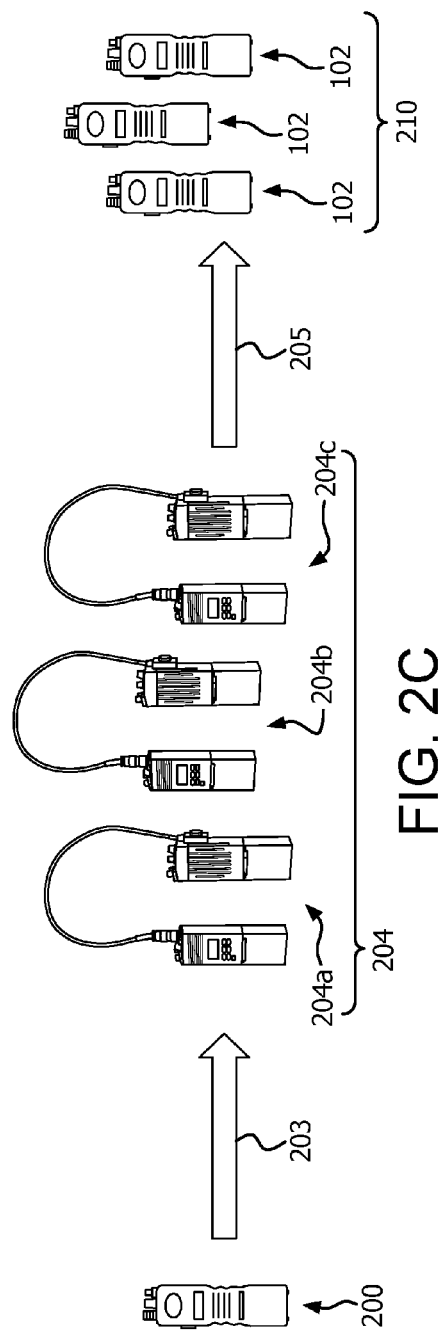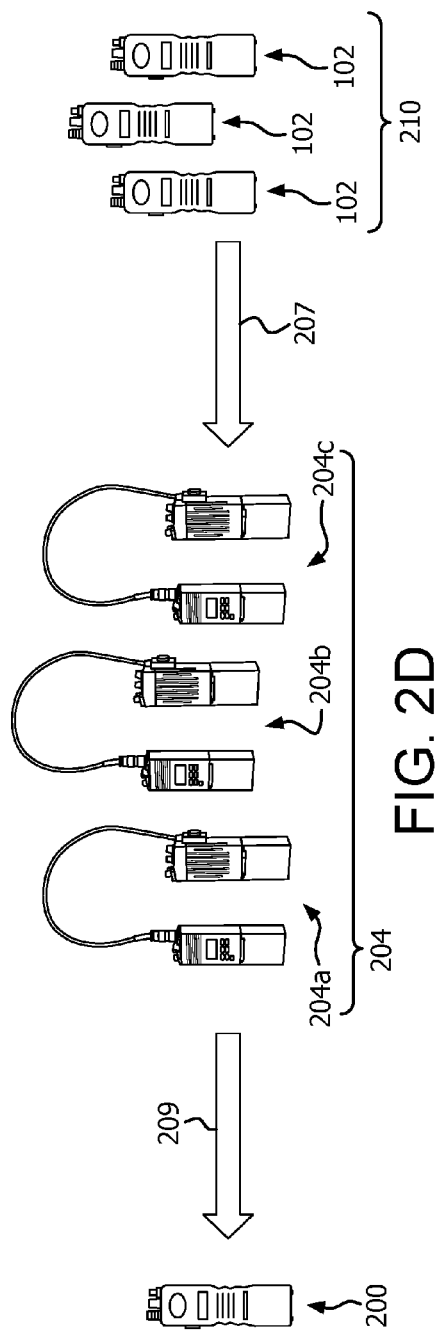

RADIO OVER INTERNET PROTOCOL DEVICES AND METHODS FOR INTEROPERABILITY WITH LAND MOBILE RADIO DEVICES

CROSS-REFERENCE TO RELATED APPLICATION

This application claims priority to U.S. provisional patent application No. 62/394,621, filed Sep. 14, 2016, which is incorporated herein by reference in its entirety.

FIELD OF THE INVENTION

This invention relates generally to radio communications. More specifically, the invention relates to radio over internet protocol (RoIP) devices (such as networked portable radios) and methods that permit such devices to operate with land mobile radio (LMR) devices (such as walkie-talkies).

BACKGROUND

Radios that can transmit and receive signals (that is, radio waves) are referred to as "two-way radios" or "transceivers." Two-way radios that are handheld devices are usually called "walkie-talkies." Other two-way radios include larger "mobile" devices—which are typically used in vehicles such as fire engines, ambulances, and police cars—and very large "base" or "base station" devices, which are usually used in fixed locations such as fire houses, ambulance-dispatch centers, and police stations. Various two-way radios are typically used together in "land mobile radio systems." These LMR systems are commonly used by federal, state, and local first responders and emergency services; by public-works companies and other businesses; and by the military.

LMRs such as walkie-talkies usually cannot both transmit signals and receive them at the same time, and so they typically use "press to transmit" or "push to talk" (PTT) technology: when a button on the walkie-talkie is depressed, the device can transmit radio signals; when the button is released, the device can receive radio signals.

LMR or PTT communications using radio waves contrast with, for example, land-line telephone communications, which traditionally took place over telephone lines (such as wires and fiber-optic cables). But just as telephone communications can now take place over the Internet with networked phones using Voice over Internet Protocol (VoIP) technology, PTT communications can now take place over the Internet with networked radios using Radio over Internet Protocol (RoIP) technology.

Networked radios offer significant advantages over LMRs, but LMRs remain widely used by the military, first responders, and other groups. Some advantages of networked radios can be provided to systems using LMRs by using LMR-to-networked-radio conversion devices. For example, a Vocality V25 bridge/router can serve as an LMR-to-networked-radio conversion box. Such known conversion devices provide rudimentary functionality that permits two different LMR systems to communicate, which generally cannot be done unless the two systems are using the same frequency.

But communication problems can arise in both LMR-only systems and systems that mix LMRs with networked radios. Consider the example of an LMR-only radio system used by members of a fire department responding to a widespread forest fire. A fire-department captain may use a single walkie-talkie type LMR to communicate with several firefighters in the field who each have their own walkie-talkies. If the fire captain is a significant distance away from one or more of the firefighters, a fixed "repeater" or retransmission device located between the captain and the firefighters, such as a radio tower that already happens to stand in the affected area of the forest, can retransmit radio signals between them. But if a retransmission device is unavailable, the useful range of the LMR system is relatively limited.

It would be advantageous to provide RoIP devices (such as networked portable radios) and methods that permit such devices to operate more effectively with LMR devices (such as walkie-talkies). Specifically, it would be advantageous to provide devices and methods for a communications system in which a source device transmits a voice communication to one or more destination devices by: (1) permitting communications among users with RoIP devices or LMR devices or both; (2) using one of the devices in the communications system as a retransmission device; (3) actively managing information about the number and type of LMRs in the system; (4) avoiding limitations on the number and type of LMRs in the system; and (5) when there is more than one LMR present that can act as a retransmission device, having the system make the best choice possible so that as many LMR-only users as possible hear the transmitted voice communication.

SUMMARY OF THE INVENTION

Devices and methods are provided that permit interoperability between radio over internet protocol (RoIP) devices and land mobile radio (LMR) devices. In one embodiment of the invention, a networked radio device includes a wireless network transceiver; a LMR signal connector; an analog-to-digital converter/digital-to-analog converter (ADC/DAC) adapted for input/output with the LMR signal connector; and a computer processor. The processor includes a sound architecture adapted for input/output with the ADC/DAC and a server. The server includes a digital audio buffer adapted for input/output with the sound architecture; a voice-activity detector adapted for input from the digital audio buffer; and a first daemon, adapted for input from the voice-activity detector, for output to the digital audio buffer, and for input/output with the wireless network transceiver. The first daemon is configured to collect data on one or more variables affecting a best-choice determination for transmitting a communications signal intended for retransmission to one or more LMR devices, and make the best-choice determination based on the data collected.

In another embodiment of the invention, the data collected includes a priority variable having a weight score that exceeds any other possible weight score.

In yet another embodiment of the invention, the data collected includes a legacy duty cycle total-weight calculation.

In yet another embodiment of the invention, the best-choice determination is based on announcement packets containing the data on one or more variables, a proximity metric, and a legacy duty cycle record.

In yet another embodiment of the invention, the server further includes a second daemon, adapted for input/output with the digital audio buffer for and input/output with the wireless network transceiver.

In yet another embodiment of the invention, the networked radio device further includes a land mobile radio operatively connected to the LMR signal connector.

In yet another embodiment of the invention, a networked radio device includes a first means for transmitting and receiving communications signals over a wireless network; a second means for receiving communications signals from a land mobile radio (LMR); a third means for performing analog-to-digital conversion/digital-to-analog conversion adapted for input/output with the second means; and a fourth means for processing data. The fourth means includes a fifth means for implementing a sound architecture adapted for input/output with the third means, and a sixth means for implementing a server. The sixth means includes a seventh means for buffering digital audio adapted for input/output with the fifth means; an eighth means detecting voice activity adapted for input from the seventh means; and a ninth means for implementing a first daemon, adapted for input from the eighth means, for output to the seventh means, and for input/output with the first means. The ninth means is configured to collect data on one or more variables affecting a best-choice determination for transmitting a communications signal intended for retransmission to one or more LMR devices, and make the best-choice determination based on the data collected.

In yet another embodiment of the invention, the sixth means further includes a tenth means for implementing a second daemon, adapted for input/output with the digital audio buffer for and input/output with the wireless network transceiver.

In yet another embodiment of the invention, the networked radio device further includes a land mobile radio operatively connected to the second means.

In yet another embodiment of the invention, a method for transmitting a communications signal includes receiving an analog communications signal from a land mobile radio (LMR); converting the analog communications signal to digital data; providing the digital data as input to a sound architecture; providing data output from the sound architecture as input a digital audio buffer; providing data output from the from the digital audio buffer to a voice-activity detector; providing data output from the from the voice-activity detector to a first daemon; and providing data output from the first daemon to a wireless network transceiver associated with the best-choice determination. The first daemon is configured to collect data on one or more variables affecting a best-choice determination for transmitting a communications signal intended for retransmission to one or more LMR devices, and make the best-choice determination based on the data collected.

In yet another embodiment of the invention, the method further includes providing data as input or output between a second daemon and the digital audio buffer, and providing data as input or output between the second daemon and the wireless network transceiver.

BRIEF DESCRIPTION OF THE DRAWINGS

FIGS. 2C and 2D are schematic diagrams showing a communications system combining land mobile radios and networked radios in accordance with another embodiment of the invention.

DETAILED DESCRIPTION OF THE PREFERRED EMBODIMENTS

Figure 1A:
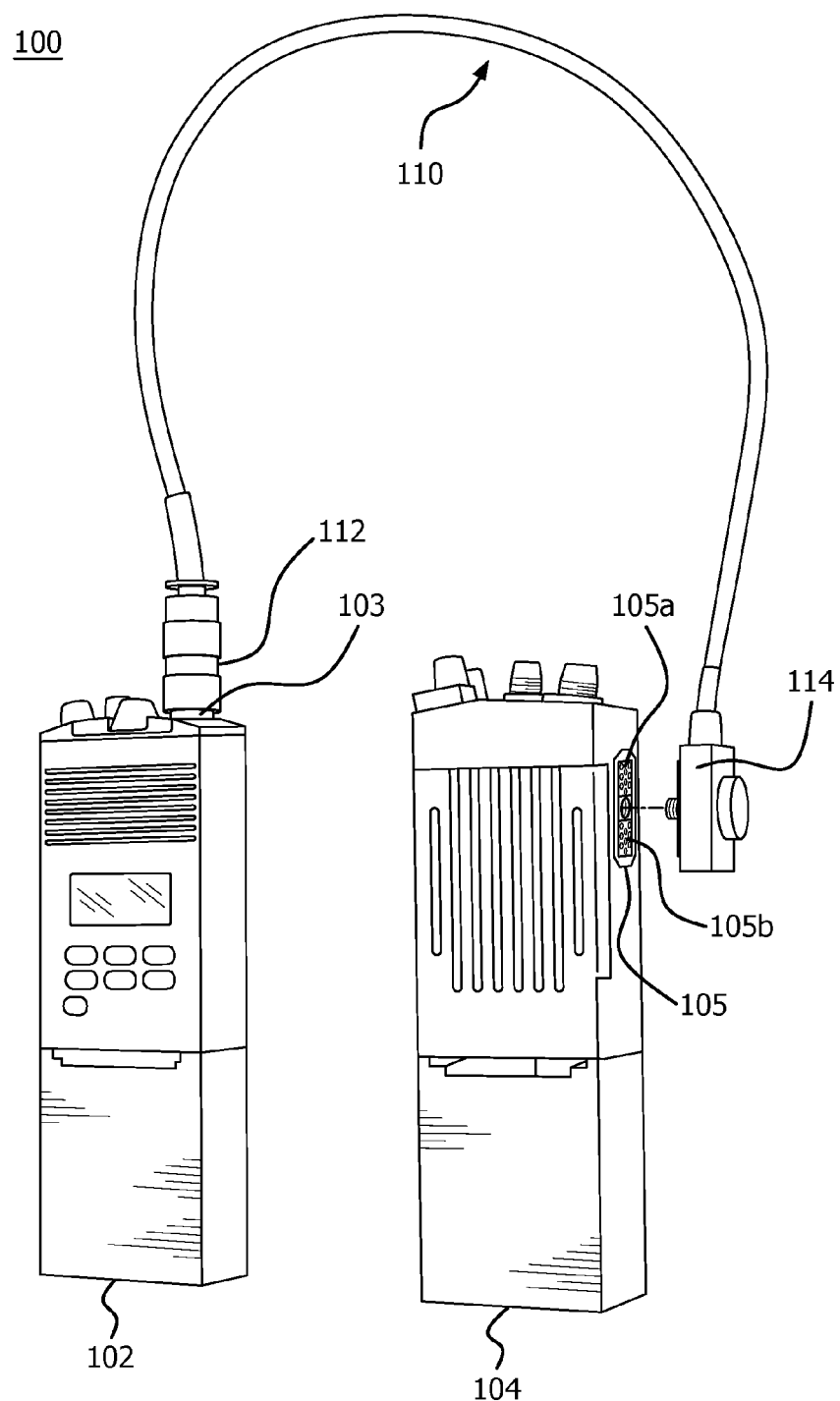
FIG. 1A is an isometric view of one embodiment in accordance with the invention.

FIG. 1A shows an embodiment of the invention used with one type of land mobile radio (LMR). Tethered radio set 100 includes LMR 102 and networked radio 104. With this embodiment, LMR 102 is a military-style portable unit such as a Thales AN/PRC-148 JEM or Harris Falcon III® radio. LMR 102 includes speaker—microphone input/output connector (speaker mic connector) 103. In this example, speaker mic connector 103 is disposed on the top of LMR 102; any disposition can be used. Any appropriate connector type (e.g., U-328/U or Hirose 6-pin connector), proprietary or nonproprietary, can be used that permits an audio signal out (speaker signal) from LMR 102 and an audio signal in (microphone signal) to LMR 102. Typically, the speaker and microphone signals are electric signals. Preferably, the speaker and microphone signals are monophonic, but stereophonic or other multichannel signals could be used.

Networked radio 104 is an RoIP device in accordance with the invention. In the example of FIG. 1A, networked radio 104 is a portable or man-portable radio. (Networked radio 104 may be referred to as an RoIP, RoIP radio, network radio, network walkie-talkie, or the like.) Networked radio 104 includes tether input/output connector (tether connector) 105, which in this example is disposed on the side of networked radio 104; any disposition can be used. Any appropriate connector type, proprietary or nonproprietary, can be used that permits receiving a speaker signal from LMR 102 and transmitting a microphone signal to LMR 102. In this example, tether connector 105 is a 22-pin connector made up of two sets of 11 pins 105a and 105b.

Tethered radio set 100 could also be a single unit in which LMR 102 and networked radio 104 are interconnected components.

Preferably, both LMR 102 and networked radio 104 are multiband devices, but either or both could be single-band devices. Optionally, networked radio 104 can include a conventional speaker—microphone unit to input and output audio signals directly to or from networked radio 104.

Transmitting signals between LMR 102 and networked radio 104 is facilitated by interconnect or tether 110. Interconnect 110 could be any wired or wireless connection. In the example of FIG. 1A, tether 110 is a straight (noncoiled) cable. At one end of tether 110 is connector plug 112, which is adapted to mate with speaker mic connector 103. At the other end of tether 110 is connector plug 114, which is adapted to mate with tether connector 105. In this example, connector plug 114 includes a screw knob that fits in a screw receptacle disposed between pin sets 105a and 105b to secure connector plug 114 in contact with tether connector 105. Connector plug 114 is shown in secured position in FIG. 1B.

Figure 1B:
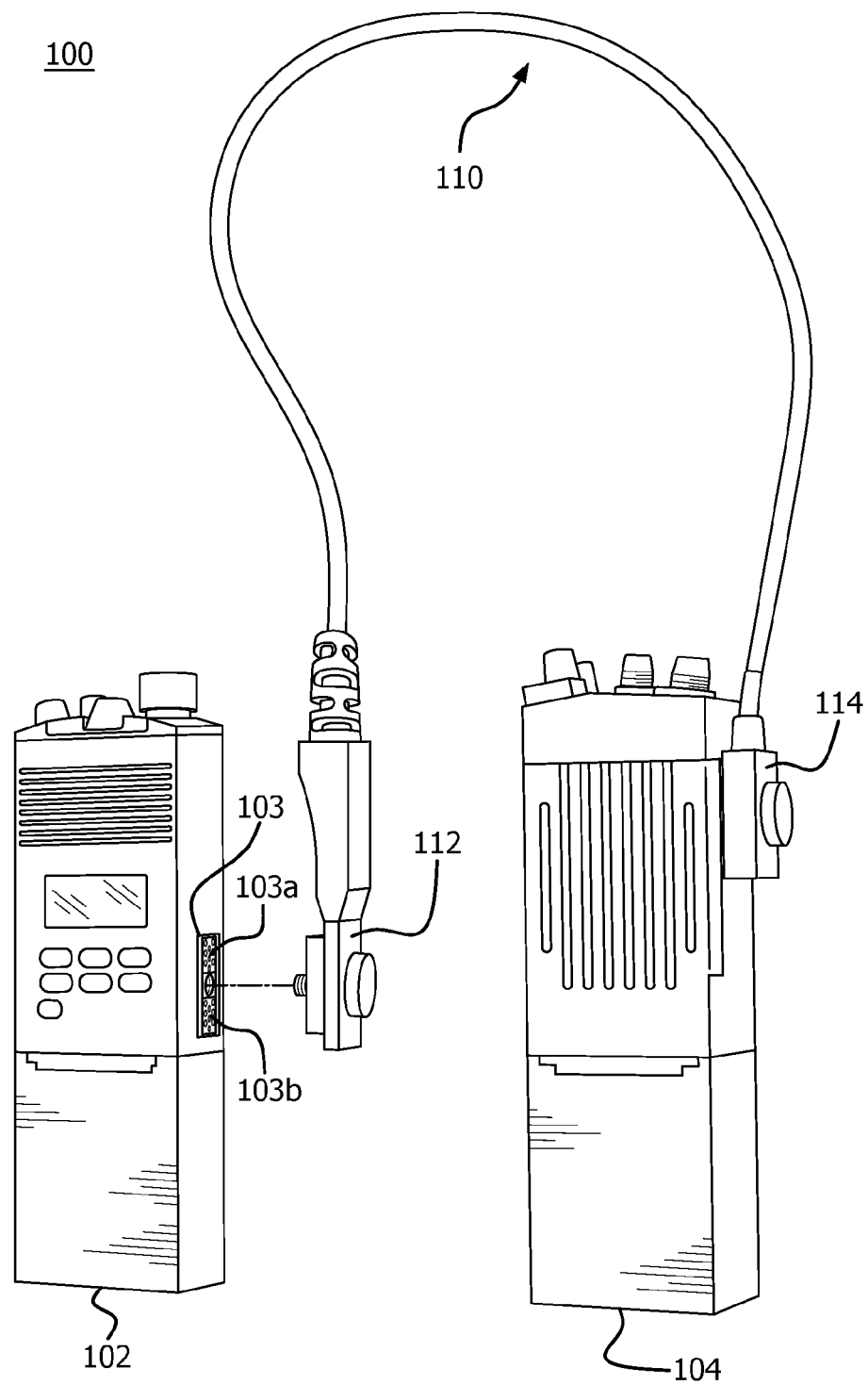
FIG. 1B is an isometric view of another embodiment in accordance with the invention.

FIG. 1B shows an embodiment of the invention used with another type of LMR. Again, tethered radio set 100 includes LMR 102 and networked radio 104. With this embodiment, LMR 102 is again a military-style portable unit, but speaker mic connector 103 is disposed on the side of LMR 102. In this example, speaker mic connector 103 is a 22-pin connector made up of two sets of 11 pins 103a and 103b. Speaker mic connector 103 may be of the same or a different type than tether connector 105, using the same or a different number of pins. For example, speaker mic connector 103 could be one proprietary 22-pin design and tether connector 105 could be a different proprietary 22-pin design.

Also in the example of FIG. 1B, connector plug 112 includes a screw knob that fits in a screw receptacle disposed between pin sets 103a and 103b to secure connector plug 112 in contact with speaker mic connector 105. Those of skill in the art will be able to design a connector plug 112 adapted to mate with most if not all types of speaker mic connector 103. Suitable components for connector plug 112 for particular speaker mic connectors 103 are also commercially available, such as a connector plug for a Harris Falcon III® AN/PRC-117G radio sold by SupplyNet (www.tacticaleng.com, Part No. TE-32ML2-ALL-06).

Figure 1C:
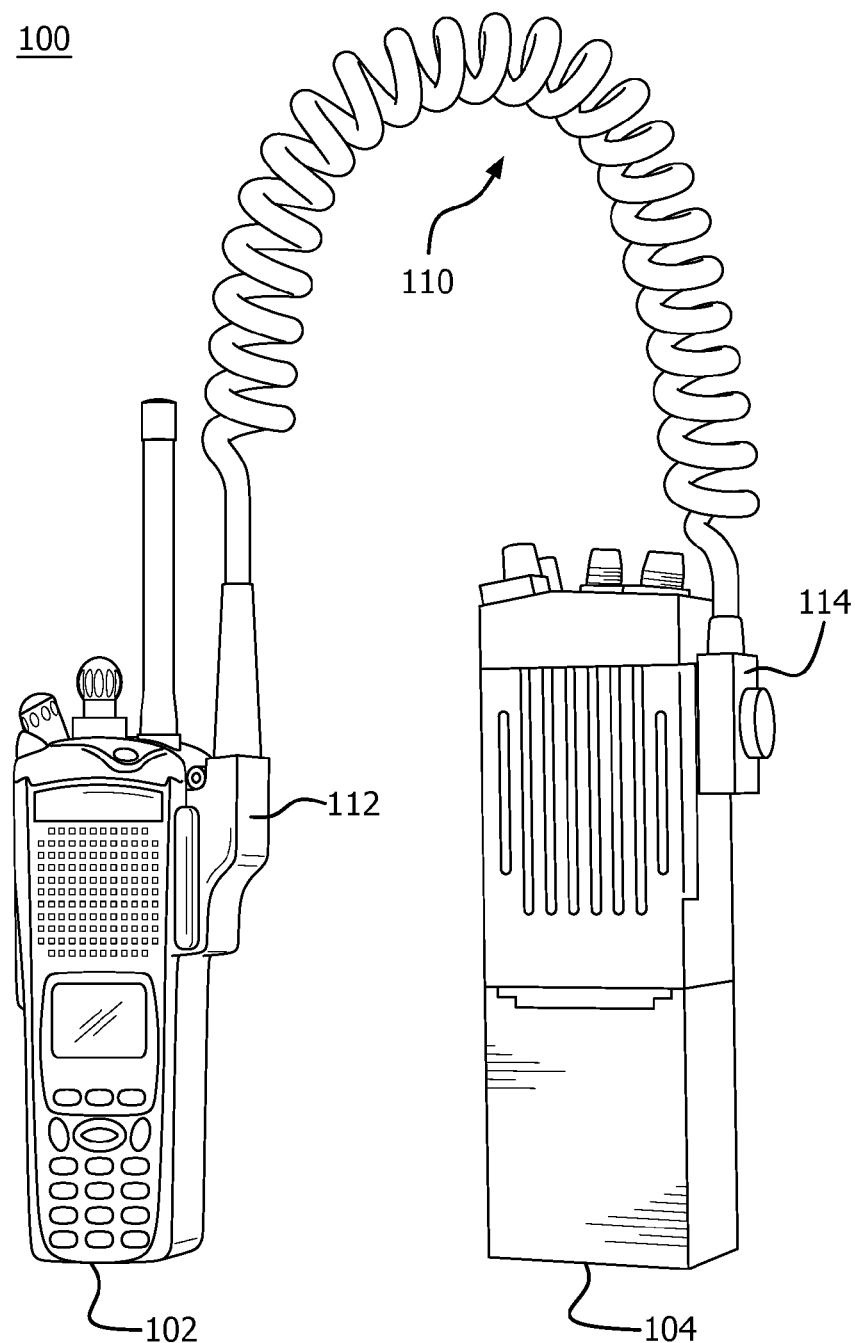
FIG. 1C is an isometric view of yet another embodiment in accordance with the invention.

FIG. 1C shows an embodiment of the invention used with yet another type of LMR. Again, tethered radio set 100 includes LMR 102 and networked radio 104. With this embodiment, LMR 102 is a nonmilitary-style portable unit such as a Motorola XTS® 5000 radio. In this example, speaker mic connector 103 is disposed on the side of LMR 102, and tether 110 is a coiled cable (but could also be noncoiled).

Figure 1D:
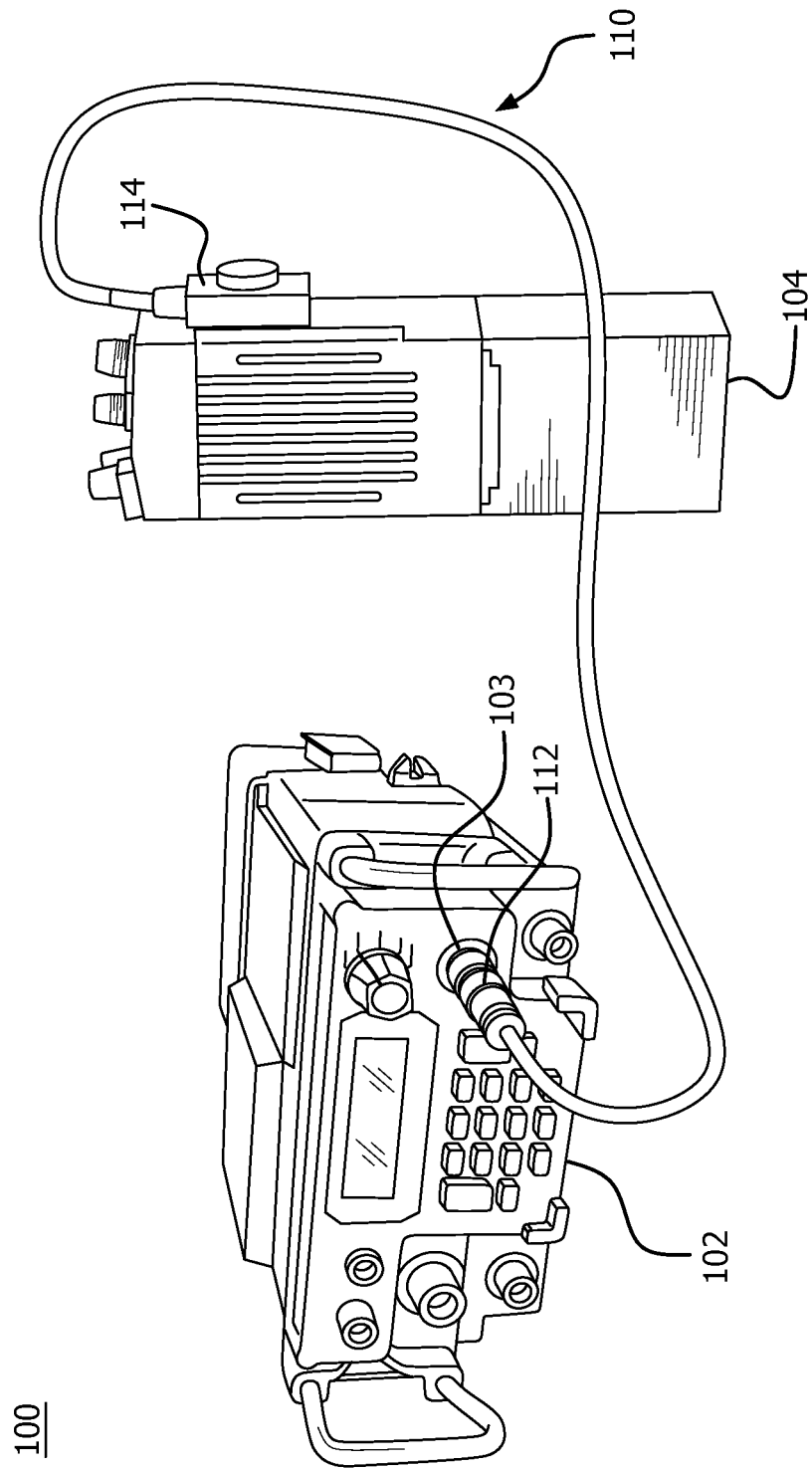
FIG. 1D is an isometric view of still another embodiment in accordance with the invention.

FIG. 1D shows an embodiment of the invention used with still another type of LMR. Again, tethered radio set 100 includes LMR 102 and networked radio 104. With this embodiment, LMR 102 is a mobile unit such as a Harris Falcon III® AN/PRC-152A radio.

Figure 2A:
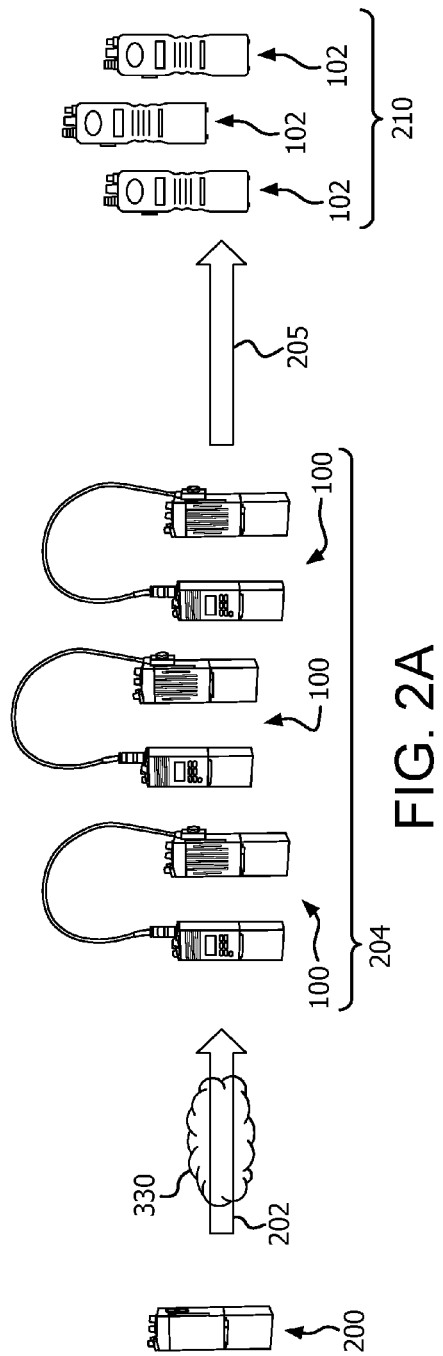
FIGS. 2A and 2B, are schematic diagrams showing a communications system combining land mobile radios and networked radios in accordance with an embodiment of the invention.

FIG. 2A illustrates an embodiment of the invention in a communications system that combines LMRs and RoIP devices, in which a voice communication from a source device is transmitted to a number of retransmission devices in accordance with the invention and then to a number of destination (or field) devices, with the retransmission devices themselves selecting which of them is best to transmit the voice communication to the field devices.

In the example of FIG. 2A, command device 200 is a networked radio 104. Command device 200 can also be another device in accordance with the invention (such as a tethered radio set 100), any other RoIP device (not in accordance with the invention, such as a Persistent Systems MPU4 networked radio).

Command device 200 could also be any kind of LMR. For ease of explanation, an embodiment of the invention with such a configuration is depicted in FIG. 2C.

In FIG. 2A, retransmission devices 204 are a number of tethered radio sets 100. (The embodiment of FIG. 1A is illustrated, but any one or more embodiments of tethered radio set 100 according to the invention can be used. Also, three tethered radio sets 100 are illustrated as retransmission devices 204; any number of two or more retransmission devices in accordance with the invention may be used, limited only by the hardware or software used.) Field devices 210 are a number of LMRs 102. (Three are illustrated; any number of one or more LMRs may be used, and one or more LMRs along with one or more tethered radio sets 100 could be used, limited only by the hardware or software used.) In this example, command device 200 is a source of a voice communication and field devices 210 are destinations for the voice communication.

In operation, a voice communication from command device 200 intended for transmission to field devices 210 is first transmitted so as may be received by retransmission devices 204. If command device 200 is a networked radio 104 or another RoIP device, the radio communication is transmitted to retransmission devices 204, as indicated schematically by arrow 202, over internet protocol (IP) network 330 (also shown schematically in FIGS. 3A and 3B). One type of IP network that could be used is a mobile ad hoc network (MANET), such as one implemented using the Persistent Systems Wave Relay® MANET solution. (For arrow 202 in FIG. 2A and arrow 208 in FIG. 2B, it will be recognized that the transmission may be accomplished using conventional wireless-network radio transceivers that are components of devices 200 and 204. Also, retransmission devices 204 may be at various relatively short or long distances from command device 200 and from one another.)

All retransmission devices 204 are on the same IP network 330 in FIG. 2A and (not depicted) in FIG. 2C. In other embodiments, multiple bridged networks could be used. When retransmission devices 204 receive a communication from command device 200, all the retransmission devices 204 process data concerning all the associated LMRs 102 and select the best retransmission device 204 to use to retransmit the communication to field devices 210.

In the example of FIG. 2A, all the networked radios 104 in tethered radio sets 100 (which make up retransmission devices 204) are on the same IP network 330. When networked radios 104 receive a communication from command device 200, all the networked radios 104 process data concerning all the associated LMRs 102 in tethered radio sets 100 to determine and select the best LMR 102 in a tethered radio set 100 to use to retransmit the communication to field devices 210.

The selected LMR 102 in a tethered radio set 100 (one of retransmission devices 204) then transmits the radio communication so as may be received by field devices 210. This is indicated schematically by arrow 205. (For arrow 205 in FIGS. 2A and 2C, and arrow 207 in FIGS. 2B and 2D, it will be recognized that the transmission may be accomplished with conventional RF transmissions, and individual LMRs 102 among field devices 210 may be at various relatively short or long distances from selected LMR 102 and from one another.) The communication—which originated from command device 200—is then received by all individual LMRs 102 among field devices 210 that are within range of the selected LMR 102.

Figure 2B:
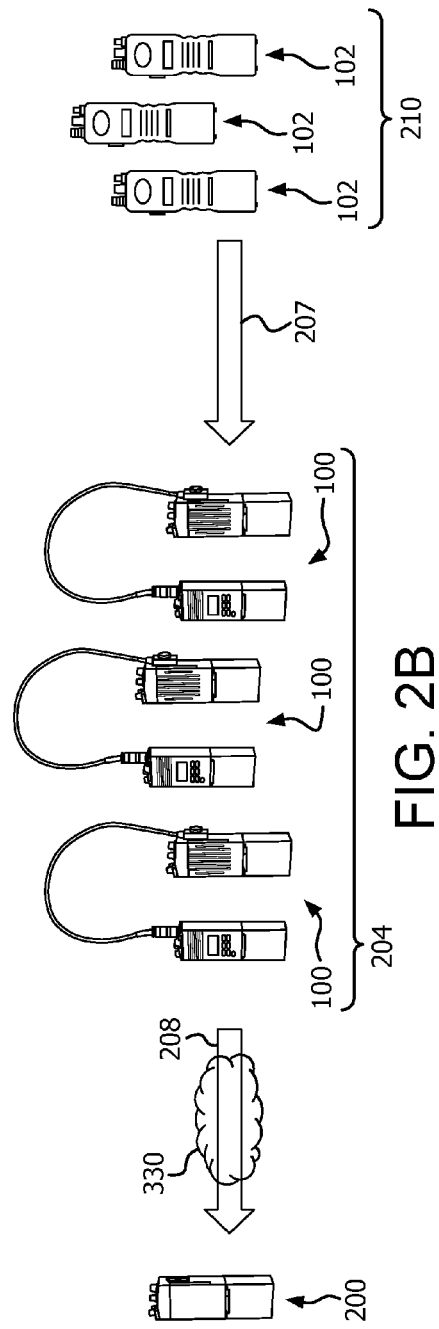

FIG. 2B illustrates the embodiment of FIG. 2A, but in this instance a voice communication from one of a number of field devices is transmitted to a number of retransmission devices in accordance with the invention and then to a command device, with the retransmission devices themselves again determining and selecting which of them is best to transmit the voice communication to the command device. In this example, one of field devices 210 is a source of a voice communication and command device 200 is a destination for the voice communication.

In this operation, a voice communication from one of field devices 210 intended for transmission to command device 200 is first transmitted so as can be received by retransmission devices 204, as indicated schematically by arrow 207. The communication is then received by all retransmission devices 204 that are within range of the sending device among field devices 210.

When retransmission devices 204 receive a communication from the sending one of field device 210, all the retransmission devices 204 process data concerning all the associated LMRs 102 and select the best retransmission device 204 to use to retransmit the communication to command device 200. The communication is then transmitted from the selected retransmission device 204 to command device 200, as indicated schematically by arrow 208, over IP network 330.

FIG. 2C illustrates an embodiment of the invention that is a variation on the embodiment shown in FIG. 2A, in which command device 200 is an LMR. In FIG. 2C, the radio communication is transmitted from command device 200 to retransmission devices 204, as indicated schematically by arrow 203, using conventional radio frequency (RF) signals. (For arrow 203 in FIG. 2C, it will be recognized that the transmission may be accomplished with conventional RF transceivers that are components of devices 200 and 204. Again, retransmission devices 204 may be at various relatively short or long distances from command device 200 and from one another.)

The communication transmitted is received by all retransmission devices 204 that are within range of command device 200. In this example, retransmission devices 204*a* and 204*b* are within range and retransmission device 204*c* is not. For each tethered radio set 100 among retransmission devices 204*a* and 204*b*, the networked radio 104 that is part of that radio set receives the communication indirectly through that radio set's LMR 102. Specifically, that radio set's LMR 102 receives the communication directly as a radio transmission, and the communication is then sent through that radio set's tether 110 to that radio set's networked radio 104, which then transmits the radio communication so as may be received by field devices 210, as indicated schematically by arrow 205.

FIG. 2D illustrates the embodiment of FIG. 2C, but in this instance a voice communication from one of a number of field devices is transmitted to a number of retransmission devices in accordance with the invention and then to a command device, with the retransmission devices themselves again determining and selecting which of them is best to transmit the voice communication to the command device. In this example, one of field devices 210 is a source of a voice communication and command device 200 is a destination for the voice communication.

In this operation, a voice communication from one of field devices 210 intended for transmission to command device 200 is first transmitted so as can be received by retransmission devices 204, as indicated schematically by arrow 207. The communication is then received by all retransmission devices 204 that are within range of the sending device among field devices 210.

When retransmission devices 204 receive a communication from the sending one of field device 210, all the retransmission devices 204 that are within range of command device 200 process data concerning all the associated LMRs 102 and select the best retransmission device 204 to use to retransmit the communication to command device 200. Again in this example, retransmission devices 204*a* and 204*b* are within range and retransmission device 204*c* is not. Therefore, only retransmission devices 204*a* and 204*b* take part in deciding which of them is best. The communication is then transmitted from the selected retransmission device 204 to command device 200, as indicated schematically by arrow 209.

Figure 3A:
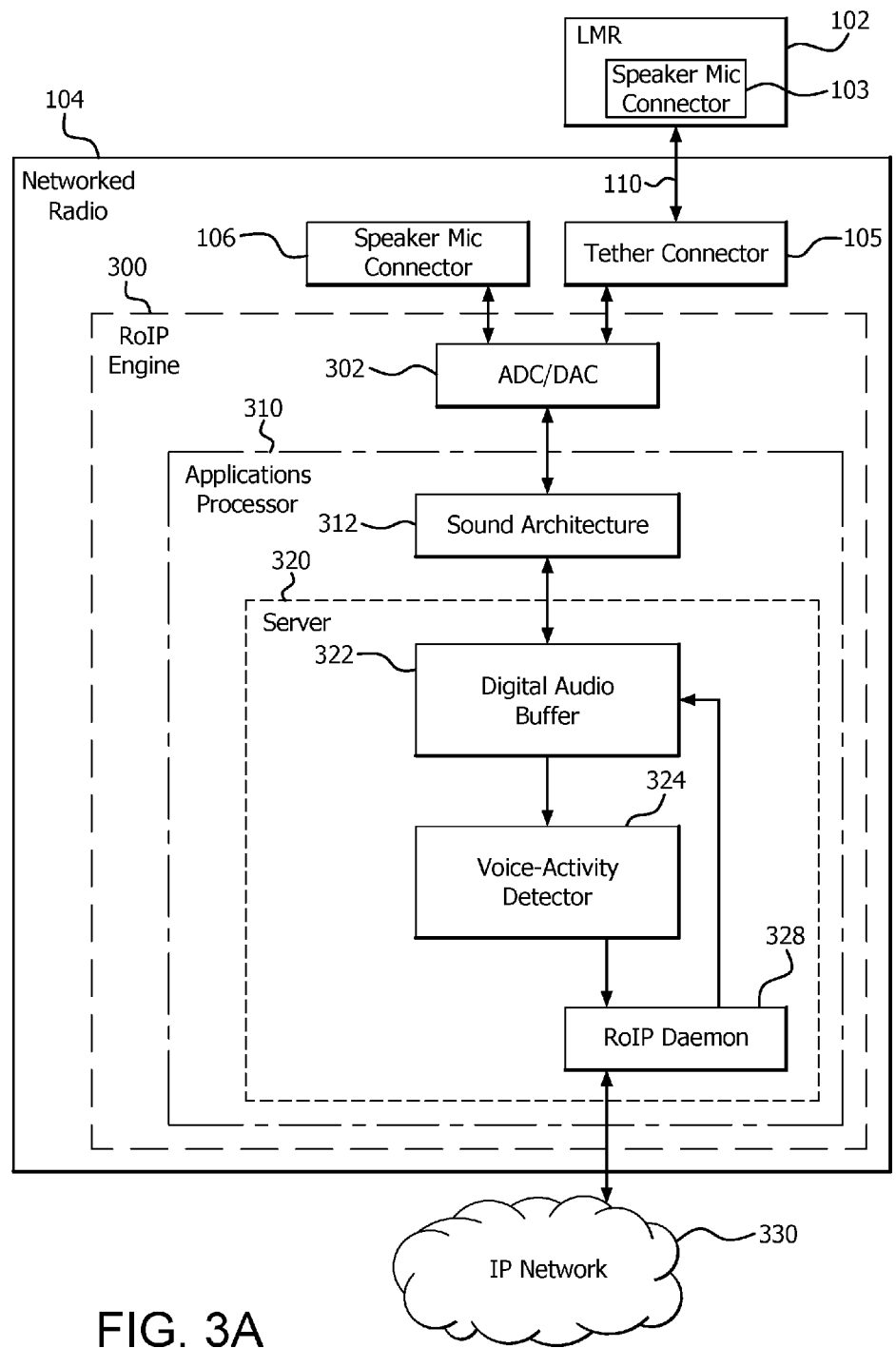
FIGS. 3A and 3B are schematic diagrams illustrating hardware and software elements in accordance, respectively, with each of two embodiments of the invention.
Figure 3B:
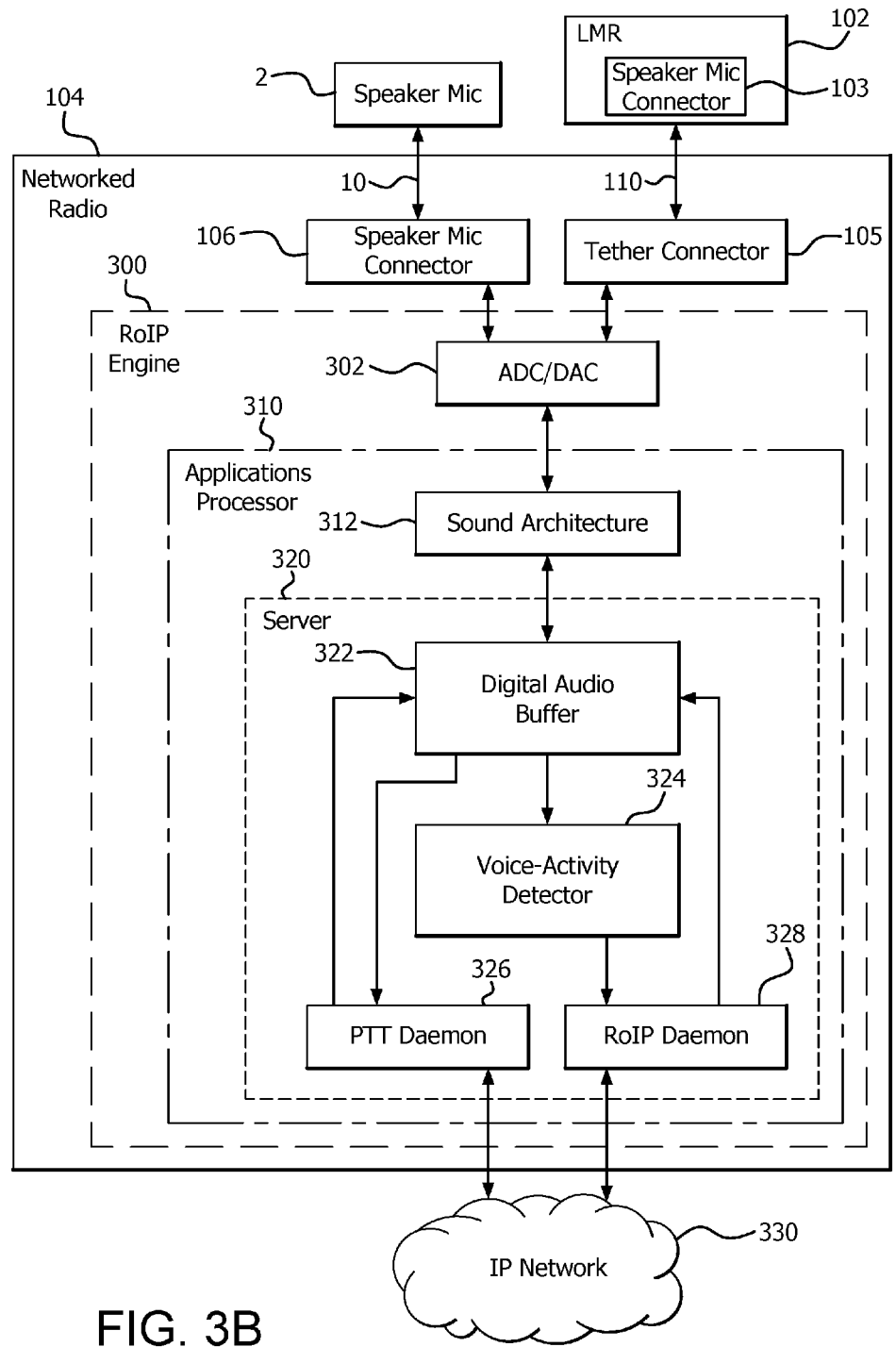

FIG. 3A illustrates one embodiment of the hardware and software in accordance with the invention. All the networked radios 104 in the examples of FIGS. 2A, 2B, 2C, and 2D use the hardware and software to process data to determine and select the best tethered radio set 100 among retransmission devices 204 to retransmit a radio communication. Each networked radio 104 includes tether connector 105 and RoIP engine 300. As shown in FIGS. 1A-1C, tether connector 105 communicates through tether 110 with speaker mic connector 103 in LMR 102. As shown in FIG. 3B, optionally, any networked radio 104 may include speaker mic connector 106, which communicates through interconnect 10 with PTT speaker mic unit 2. Speaker mic connectors 103 and 106 may be the same or different proprietary or nonproprietary connectors.

RoIP engine 300 includes analog-to-digital converter/digital-to-analog converter (ADC/DAC) 302 and applications processor 310. One suitable component for ADC/DAC 302 is a Wolfson audio chip. One suitable component for applications processor 310 is an NXP i.MX6 quad-core processor.

Software implemented on applications processor 310 includes sound architecture 312 and server 320. Sound architecture 312 functions as a bridge between ADC/DAC 302 and server 320. One suitable implementation for sound architecture 312 is Linux Alsa. Server 320 would then be implemented as an Alsa server.

Software implemented on server 320 includes digital buffer 322, voice-activity detector 324, and RoIP daemon 328. One suitable implementation for digital audio buffer 322 is a 16-bit signed PCM buffer at 8 kHz (uncompressed audio). As shown in FIG. 3B, optionally, PTT daemon 326 may be used if it is desired to permit networked radio 104 to receive audio over IP network 330 and output the audio to a PTT device such as PTT speaker mic unit 2.

When a networked radio 104 receives a radio communication through IP network 330, data representing the communication is sent to RoIP daemon 328. The data is processed as described in FIGS. 4-7 to determine and select which LMR 102 portion of retransmission devices 204 is best. Once the best LMR 102 is selected, the associated networked radio 104 sends the data to digital audio buffer 322. Data from digital audio buffer 322 is sent to sound architecture 312, then to ADC/DAC 302, which generates an analog electrical signal. That signal is then sent to tether connector 105, and then through tether 110 to speaker mic connector 103 on the selected LMR 102.

When a networked radio 104 receives at its tether connector 105 a radio communication from an LMR 102 through its speaker mic 103 and a tether 110, an electrical signal representing the communication is sent from tether connector 105 to ADC/DAC 302, which generates data representing the communication. (Optionally, as shown in FIG. 3B, networked radio 104 may receive at its speaker mic connector 106 a signal for a radio communication from speaker mic 2 and interconnect 10; an electrical signal representing the communication is sent from speaker mic connector 106 to ADC/DAC 302, which generates data representing the communication.) The data generated is then sent to sound architecture 312, and then to digital audio buffer 322. If the communication had been received at tether connector 105, the data is next sent to voice-activity detector 324 to determine if the data represents a voice communication. If the communication had been received at speaker mic connector 106, the data is sent to PTT daemon 326.

If the data received at voice-activity detector 324 is determined to represent voice activity, the data is sent to RoIP daemon 328. The data is processed as described, for example, in FIGS. 4-7 to determine and select which LMR 102 is best. Once the best LMR 102 is selected, the associated networked radio 104 sends the data to digital audio buffer 322. Data from digital audio buffer 322 is sent to sound architecture 312, then to ADC/DAC 302, then to tether connector 105, and then through tether 110 to speaker mic connector 103 on the selected LMR 102 such that the selected LMR 102 transmits an RF signal radio communication.

Figure 4:
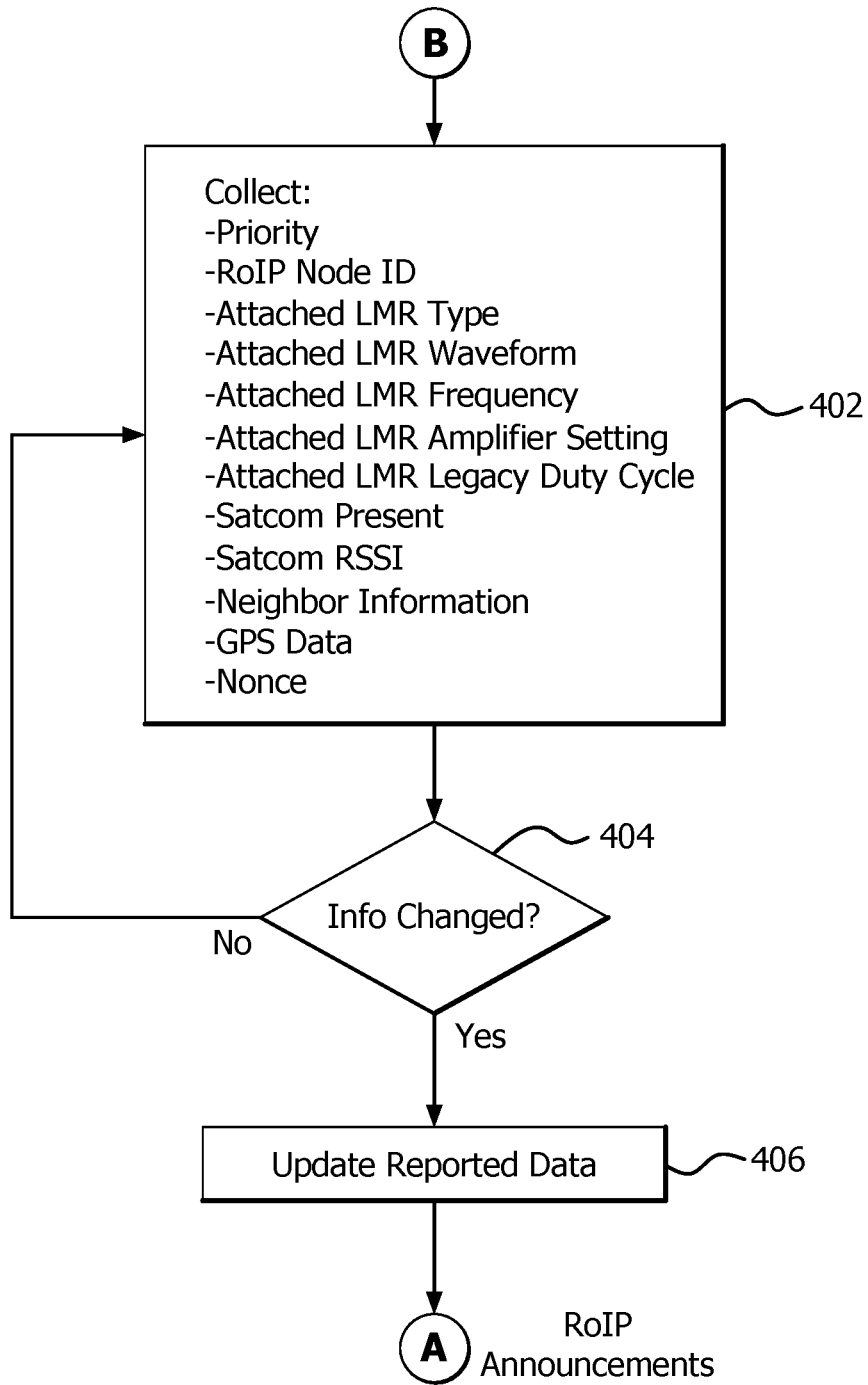
FIG. 4 is a flowchart illustrating an example of data processing for decision-variable collection in accordance with embodiments of the invention.

FIG. 4 illustrates an example of data processing for decision-variable collection carried out by RoIP daemon 328 in a networked radio 104 in accordance with the invention. Data representing one or more variables affecting a best-choice determination or decision is collected at block 402. Preferably, the data collection occurs continuously or substantially continuously. In the example of FIG. 4, the decision variables (in no particular order) are: (1) Priority; (2) RoIP Node ID; (3) Attached LMR Type; (4) Attached LMR Waveform; (5) Attached LMR Frequency; (6) Attached LMR Amplifier Setting; (7) Attached LMR Legacy Duty Cycle; (8) Satcom Present; (9) Satcom Received Signal Strength Indicator (RSSI); (10) Neighbor Information; (11) GPS Data; and (12) Nonce (a random number). For example, by way of jump point B in FIG. 6, block 402 receives a Legacy Duty Cycle (LDC) total-weight calculation. Any number of variables could be considered, limited only by the hardware or software used. For example, other variables include ambient-light data (such as from a light sensor), position data (such as from a position estimator), routing metric, LMR duty cycle, altitude, pressure, and temperature. In general, the more decision variables considered, the better will be the best-choice determination.

In addition, decision variables such as these may be implemented in a variety of ways, as those skilled in the art will understand. Preferably in this example:

the Priority variable has a weight score that will exceed any other possible weight score, such that when the Priority variable is invoked for a particular tethered radio set 100, that weight score will ensure that RoIP daemon 328 will determine that the LMR 102 in that tethered radio set 100 is the best choice;

the Attached LMR Amplifier Setting variable will be yes/no, indicating either the presence or absence of an amplifier; and the Neighbor Information variable indicates the number of networked radios 104 on IP network 330 and the link quality between nodes (with information about such link quality preferably provided by using a Persistent Systems' Wave Relay® MANET solution for IP network 330).

Data processing in RoIP daemon 328 at block 404 considers whether the information comprising the variables data has changed. If not, processing returns to block 402; if so, processing proceeds to block 406. At block 406, reported data regarding the variables is updated. Processing then proceeds to provide data in RoIP Announcement Packets as indicated at jump point A in FIGS. 4 and 7. Other data can be included with the RoIP Announcement Packets. For example, each RoIP Announcement Packet preferably also includes a proximity metric for each retransmission device 204 based on network conditions between it and command device 200. Those skilled in the art will recognize that any metric may be used that appropriately represents the topology and conditions of IP network 330. When using Persistent Systems MPU5 networked radios for networked radios 104 and the Persistent Systems Wave Relay® MANET solution to implement IP network 330, a metric associated with the Wave Relay® MANET solution may be used.

Figure 5:
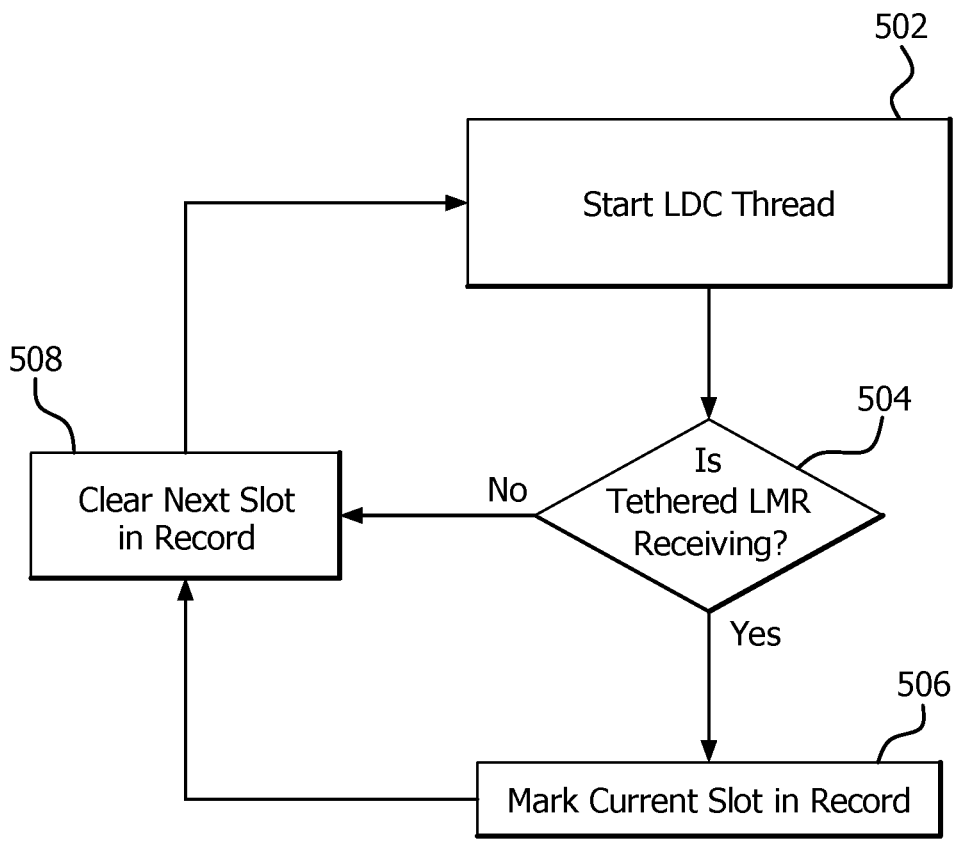
FIG. 5 is a flowchart illustrating another aspect of an example of data processing for Legacy Duty Cycle data in accordance with embodiments of the invention.

FIG. 5 illustrates another aspect of this example of data processing carried out by RoIP daemon 328 in networked radio 104. At block 502, a Legacy Duty Cycle (LDC) Thread is started. Block 504 considers whether an LMR 102 connected to the networked radio 104 including RoIP daemon 328 is receiving communications signals. If so, processing proceeds to block 506; if not, processing proceeds to block 508. At block 506, which represents a record where LDC data is kept, a current spot in an LDC record is marked and processing proceeds to block 508. At block 508, the next slot in the record is cleared and processing returns to block 502.

Figure 6:
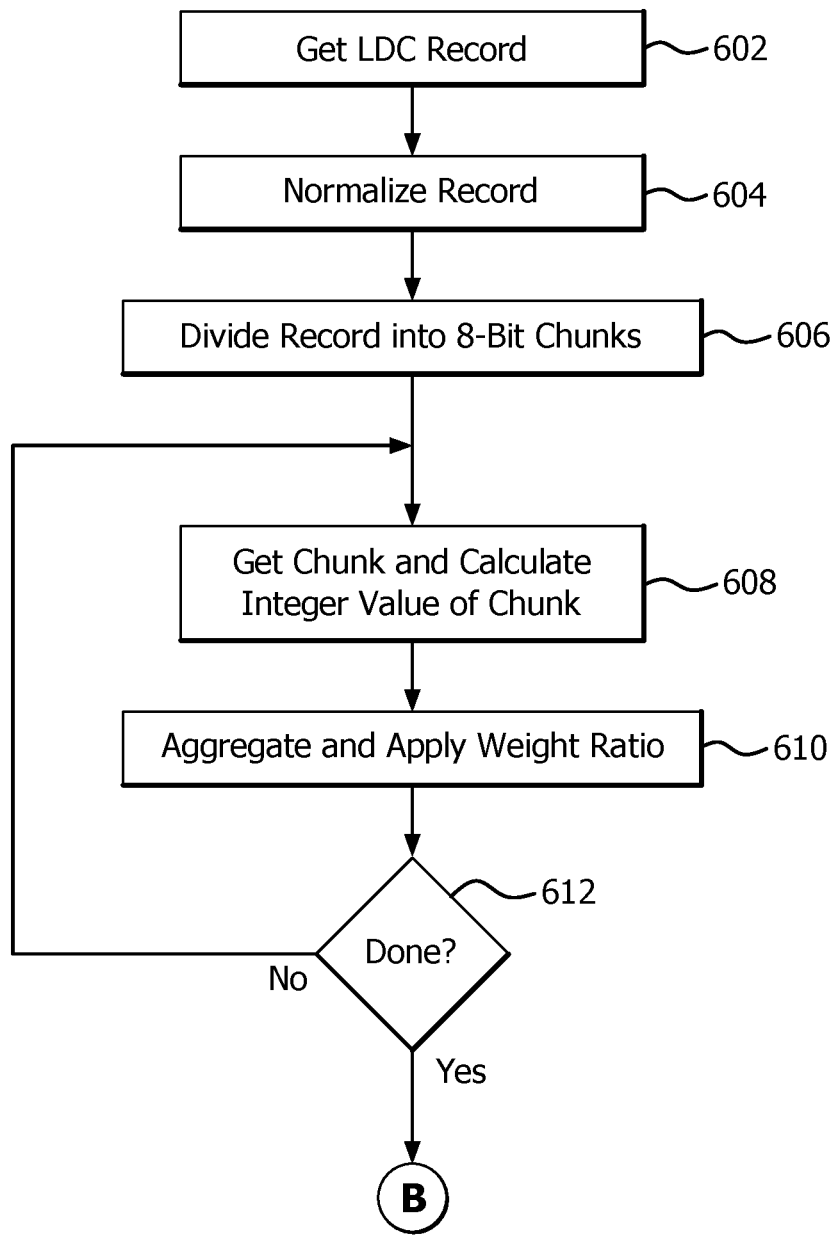
FIG. 6 is a flowchart illustrating an example of data processing for Legacy Duty Cycle total-weight calculation in accordance with embodiments of the invention.

FIG. 6 illustrates an example of data processing for LDC total-weight calculation carried out by RoIP daemon 328 in networked radio 104. At block 602, the daemon gets the LDC record (kept at block 506) and processing proceeds to block 604, where the record is normalized. At block 606, the LDC record is divided into eight-bit chunks, at block 608 the daemon gets the chunk and calculates its integer value, and at block 610 the daemon aggregates and applies a weight ratio. Preferably, the LDC record is a rolling buffer that holds a record of last 256 seconds and indicates whether, for any given second in the range, tethered networked radio 104 was receiving transmissions from LMR 102. When chunks are created and integer values calculated, two different records can have the same integer value (e.g., a few seconds of audio very recently received can be equivalent to long periods of received transmissions earlier in time). A user can choose to provide, for example, that it is more important if a tethered LMR 102 received audio in the last few seconds than if it did so three minutes ago, and therefore the user can choose to apply a weight ratio that will "amplify" the chunks at a specific time to a higher value and therefore make it more significant than other times. For instance, a user can choose to say that the last 20 seconds are 10 times more important than any other time, and therefore the chunk representing the last 20 seconds will be multiplied by 10 to give nodes (networked radios 104 on IP network 330) that were receiving in that period more weight and therefore a higher score.

At block 612, the daemon determines whether sufficient processing is done. If not, processing returns to block 608; if so, processing proceeds as indicated at jump point B in FIGS. 6 and 7.

Figure 7:
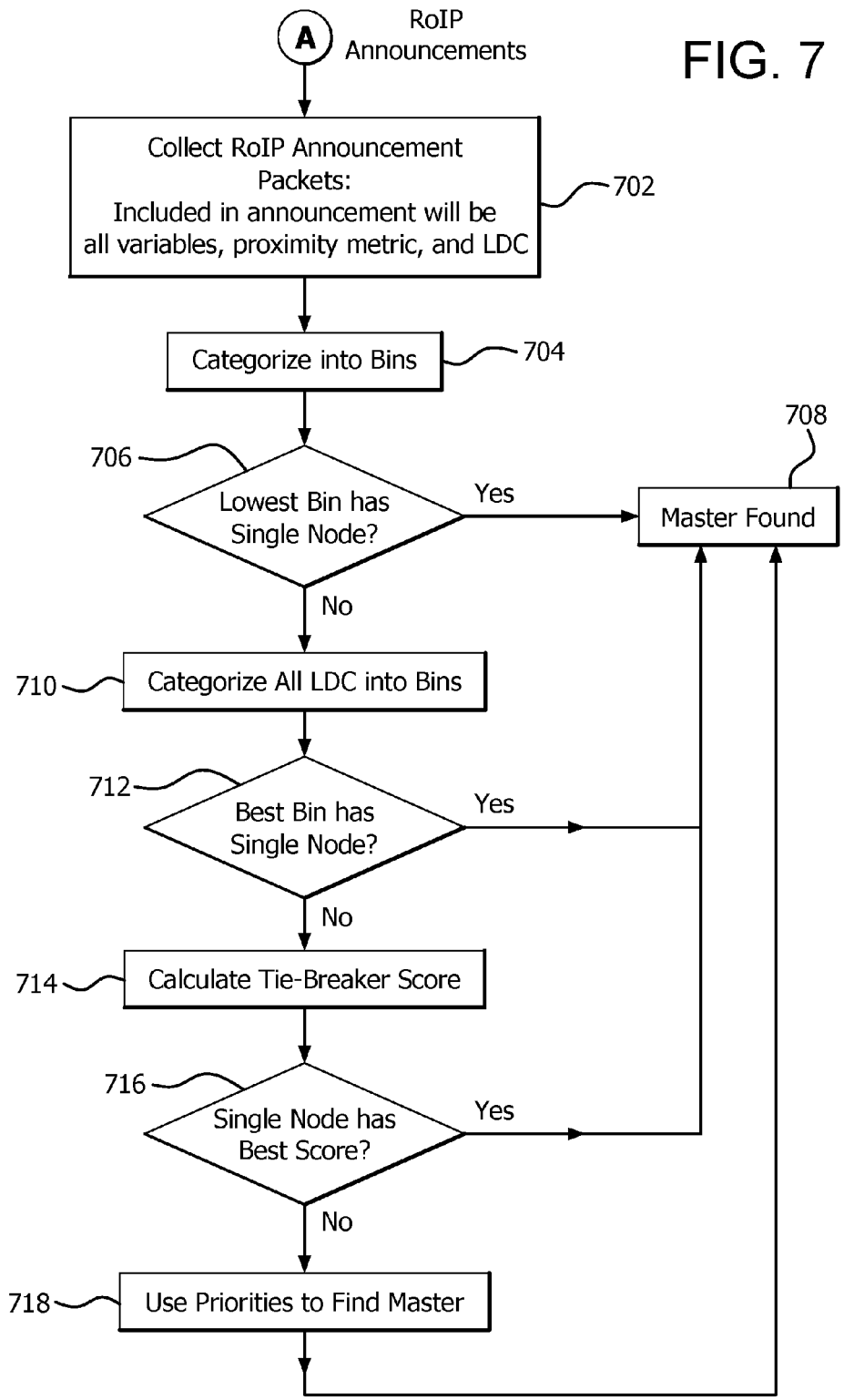
FIG. 7 is a flowchart illustrating an example of data processing for a device-selection decision in accordance with embodiments of the invention.

FIG. 7 illustrates an example of data processing for a selection decision carried out by RoIP daemon 328 in networked radio 104. At block 702, the daemon collects RoIP announcement packets, which include all decision variables, a proximity metric, and the LDC record. The daemon at block 704 collects all those values into "bins" of data, and at block 706 determines whether the lowest bin has a single node.

If so, processing proceeds to block 708, where the daemon indicates that a master—a best choice for a tethered radio set 100 for retransmitting a communications signal—has been determined and that tethered radio set 100 is selected. If not, processing proceeds to block 710.

At block 710, the daemon categorizes all LDCs into bins. At block 712, the daemon determines whether the best bin has a single node. If so, processing proceeds to block 708, where the daemon indicates that a master has been found.

If not, processing proceeds to block 714, where the daemon calculates a tie-breaker score. The daemon determines at block 716 whether a single node has the best score. If so, processing proceeds to block 708, where the daemon indicates that a master has been found. If not, processing proceeds to block 718, where the daemon uses predetermined priorities rules to select a master. Processing then proceeds to block 708, where the daemon indicates that a master has been found.

To further explain this example: When all the nodes (networked radios 104 in IP network 330) fall in the same proximity metric and LDC bins, processing by RoIP daemon 328 will go into a tie-breaker. All nodes have all the data that each node collected as shown in block 402. Every node sums up the data provided by other nodes and determines the best score for each node. If any single node has a better score based on collected parameters, that node becomes the master (the selected radio), otherwise the nodes move on to choose a master based on priority and nonce settings.

Figure 8:
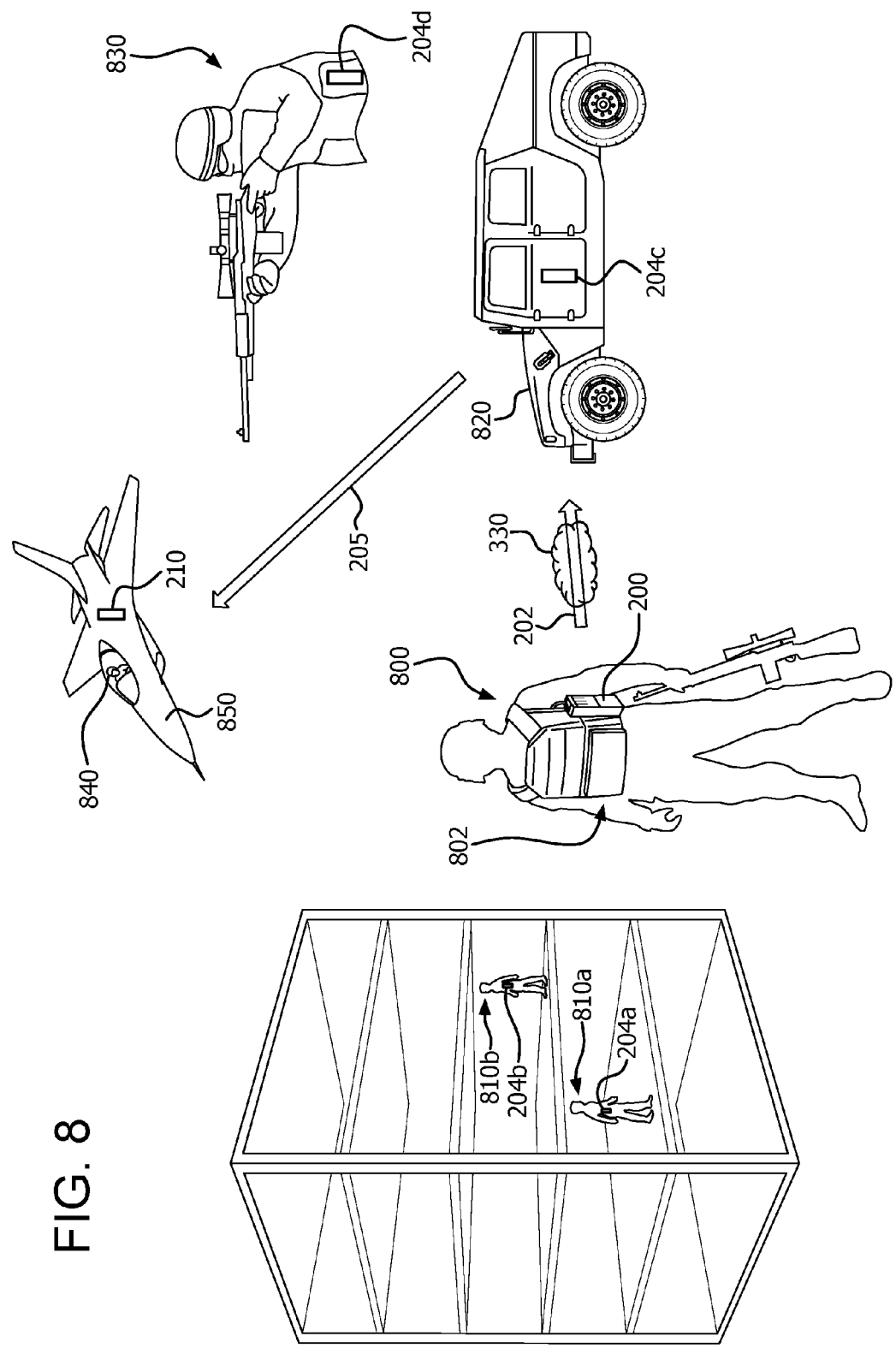
FIG. 8 is a schematic diagram showing a communications system combining land mobile radios and networked radios in accordance with an embodiment of the invention that is an example of the embodiment depicted in FIGS. 2A and 2B.

FIG. 8 illustrates an embodiment of the invention that is an example of the embodiment depicted in FIG. 2A. In this example, soldier 800 wearing tactical vest 802 wishes to communicate with pilot 840 in airplane 850 that includes field device 210 (which is an LMR 102). The soldier has attached to tactical vest 802 command device 200 (which is a networked radio 104). Soldiers 810a and 810b (located in a building), vehicle 820, and soldier 830 (located at a sniper position) have retransmission devices 204a, 204b, 204c, and 204d, respectively (each of which is a tethered radio set 100). Typically, retransmission devices 204a and 204b with soldiers 810a and 810b, respectively, are tethered radio sets 100 like those depicted in FIG. 1A or 1B, using a portable LMR such as a Harris Falcon III® AN/PRC-152A radio. Also typically, retransmission device 204c in vehicle 830 is a tethered radio set 100 like that depicted in FIG. 1D, using a mobile LMR such as a Harris Falcon III® AN/PRC-117G radio.

In this example, the devices according to the invention—command device 200 retransmission devices 204a, 204b, 204c, and 204d—determine and select which retransmission device (each of which is a tethered radio set 100) to use to retransmit communication signals to field device 210 (an LMR 102) in airplane 850. Consider, for instance, that the following values exist for the variables collected by the devices according to the invention:

(1) for soldiers 810a and 810b in the building, the LMRs 102 that are part of tethered radio sets 100 (for retransmission devices 204a and 204b) are PRC-152A radios; the PRC-152A radios have no external power amplifiers attached; the PRC-152A radios have a relatively low duty cycle (because, in this example, standard RF signals are blocked by the building infrastructure); and the PRC-152A radios have no GPS fix (because, in this example, they are inside a building that obstructs GPS signals).

(2) for vehicle 820, the LMR 102 that is part of tethered radio set 100 (for retransmission device 204c) is a PRC-117G radio; and the PRC-117G radio has a GPS fix.

(3) for soldier 830 at the sniper position, the LMR 102 that is part of tethered radio set 100 (for retransmission device 204d) is a PRC-152A radio; the PRC-152A radio has no external power amplifier; at this position, the PRC-152A radio has a relatively high duty cycle; and the PRC-152A radio has a GPS fix.

In this example, if all networked radios (command device 200 and the networked radios 104 that are part of each tethered radio set 100 for retransmission devices 204a-d) are ranked as being in the same proximity metric, the best is retransmission device 204c in vehicle 820. Therefore, the devices according to the invention transmit communication signals—initiated by soldier 800 wearing vest 802 using command device 200—first over IP network 330 to retransmission device in vehicle 820 (as indicated by arrow 202), and then to field device 210 in airplane 8850 (as indicated by arrow 205).

The invention claimed is:

1. A networked radio device, comprising:
   (a) a wireless network transceiver;
   (b) a land mobile radio (LMR) signal connector;
   (c) an analog-to-digital converter/digital-to-analog converter (ADC/DAC) adapted for input/output with the LMR signal connector; and
   (d) a computer processor, comprising:
      (i) a sound architecture adapted for input/output with the ADC/DAC; and
      (ii) a server, comprising:
         (1) a digital audio buffer adapted for input/output with the sound architecture;
         (2) a voice-activity detector adapted for input from the digital audio buffer;
         (3) a first daemon, adapted for input from the voice-activity detector, for output to the digital audio buffer, and for input/output with the wireless network transceiver, wherein the first daemon is configured to:
            (A) collect data on one or more variables affecting a best-choice determination for transmitting a communications signal intended for retransmission to one or more LMR devices; and
            (B) make the best-choice determination based on the data collected.

2. A networked radio device as claimed in claim 1, wherein the data collected includes a priority variable having a weight score that exceeds any other possible weight score.

3. A networked radio device as claimed in claim 1, wherein the data collected includes a legacy duty cycle total-weight calculation.

4. A networked radio device as claimed in claim 1, wherein the best-choice determination is based on announcement packets containing the data on one or more variables, a proximity metric, and a legacy duty cycle record.

5. A networked radio device as claimed in claim 1, wherein the server further comprises a second daemon, adapted for input/output with the digital audio buffer for and input/output with the wireless network transceiver.

6. A networked radio device as claimed in claim 1, further comprising a land mobile radio operatively connected to the LMR signal connector.

7. A networked radio device, comprising:
   (a) first means for transmitting and receiving communications signals over a wireless network;
   (b) second means for receiving communications signals from a land mobile radio (LMR);
   (c) third means for performing analog-to-digital conversion/digital-to-analog conversion adapted for input/output with the second means; and
   (d) fourth means for processing data, comprising:
      (i) fifth means for implementing a sound architecture adapted for input/output with the third means; and (ii) sixth means for implementing a server, comprising:
(1) seventh means for buffering digital audio adapted for input/output with the fifth means;
(2) eighth means detecting voice activity adapted for input from the seventh means;
(3) ninth means for implementing a first daemon, adapted for input from the eighth means, for output to the seventh means, and for input/output with the first means, wherein the ninth means is configured to:
(A) collect data on one or more variables affecting a best-choice determination for transmitting a communications signal intended for retransmission to one or more LMR devices; and
(B) make the best-choice determination based on the data collected.

8. A networked radio device as claimed in claim 7, wherein the data collected includes a priority variable having a weight score that exceeds any other possible weight score.

9. A networked radio device as claimed in claim 7, wherein the data collected includes a legacy duty cycle total-weight calculation.

10. A networked radio device as claimed in claim 7, wherein the best-choice determination is based on announcement packets containing the data on one or more variables, a proximity metric, and a legacy duty cycle record.

11. A networked radio device as claimed in claim 7, wherein the sixth means further comprises a tenth means for implementing a second daemon, adapted for input/output with the digital audio buffer for and input/output with the wireless network transceiver.

12. A networked radio device as claimed in claim 7, further comprising a land mobile radio operatively connected to the second means.

13. A method for transmitting a communications signal, comprising:
(a) receiving an analog communications signal from a land mobile radio (LMR);
(b) converting the analog communications signal to digital data;
(c) providing the digital data as input to a sound architecture;
(d) providing data output from the sound architecture as input a digital audio buffer;
(e) providing data output from the digital audio buffer to a voice-activity detector;
(f) providing data output from the voice-activity detector to a first daemon, wherein the first daemon is configured to:
(i) collect data on one or more variables affecting a best-choice determination for transmitting a communications signal intended for retransmission to one or more LMR devices; and
(ii) make the best-choice determination based on the data collected; and
(g) providing data output from the first daemon to a wireless network transceiver associated with the best-choice determination.

14. A method as claimed in claim 13, wherein the data collected includes a priority variable having a weight score that exceeds any other possible weight score.

15. A method as claimed in claim 13, wherein the data collected includes a legacy duty cycle total-weight calculation.

16. A method as claimed in claim 13, wherein the best-choice determination is based on announcement packets containing the data on one or more variables, a proximity metric, and a legacy duty cycle record.

17. A method as claimed in claim 13, further comprising: providing data as input or output between a second daemon and the digital audio buffer; and providing data as input or output between the second daemon and the wireless network transceiver.

* * * * *